April 28, 1936. F. T. KREIN 2,038,576
FROZEN CONFECTION WRAPPER
Original Filed March 14, 1934
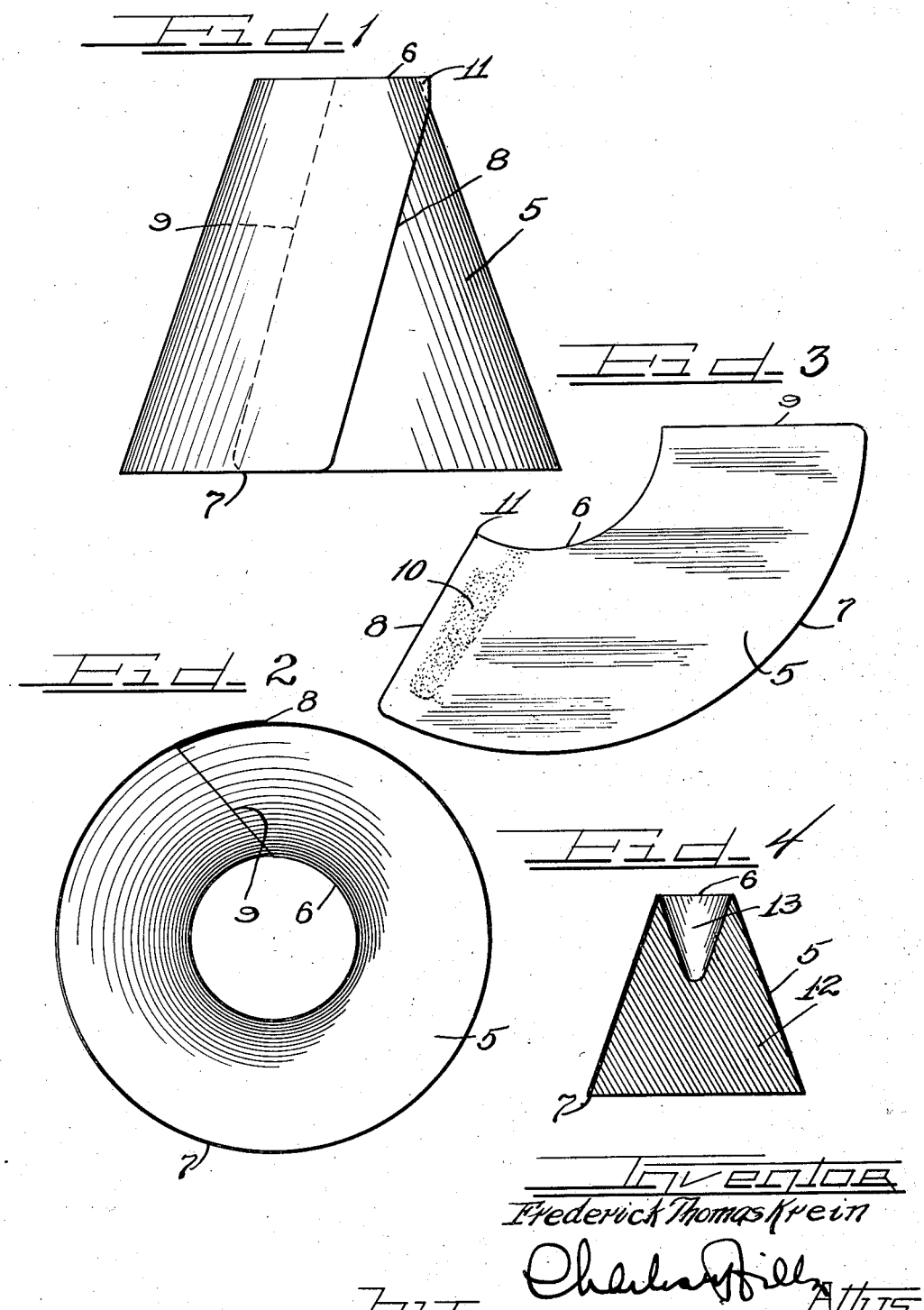
Inventor
Frederick Thomas Krein Patented Apr. 28, 1936

2,038,576

UNITED STATES PATENT OFFICE 2,038,576

FROZEN CONFECTION WRAPPER

Frederick Thomas Krein, Park Ridge, Ill., assignor to Vortex Cup Company, Chicago, Ill., a corporation of Delaware Original application March 14, 1934, Serial No. 715,425. Divided and this application July 20, 1934, Serial No. 736,200

1 Claim. (Cl. 229—1.5)

This invention relates to improvements in a wrapper highly desirable for use in connection with frozen confections, such as ice cream, frozen sherbet, and the like, the wrapper being easily removable for the purpose of dispensing the confection to an ultimate purchaser or consumer, although the invention may have other uses and purposes as will be apparent to one skilled in the art.

The present invention comprises divisional subject matter from my copending application for patent entitled "Frozen confection and wrapper therefor", Serial No. 715,425, filed March 14, 1934.

The modern trend in the dispensing of frozen confections, such as ice cream, sherbets and the like, is leading toward the individual wrapping of individual portions of confections in a suitable wrapper or container, preferably made of paper or equivalent material, and the removal of the container or wrapper at the time the confection is dispensed to the consumer or purchaser. Each purchaser is thereby assured of receiving a correct amount of confection proportional to the amount of his purchase in a wholly sanitary manner, and the retail dealer is afforded a saving in confection over the old method of dispensing such substance by scooping the confection from a bulk container. It is of course desirable that the wrappers on the individual portions of confections may be removed in an exceedingly simple manner and with great facility, without any danger of the fingers of the server inadvertently contacting the confection proper. It is further desirable to provide wrappers for the confection consistent with various shapes of confections, so that immediately upon dispensing, the confection has the proper shape for the particular purpose for which it is to be used, such as in ice cream cones, sodas, sundaes, salads, or items of like character.

With the foregoing in mind, it is an object of this invention to provide a wrapper for frozen confections which is extremely easy to manipulate and remove without any necessity for the attendant to touch the confection with his fingers, and where there is little or no likelihood of the attendant accidentally touching the confection while removing the wrapper or serving or dispensing the confection.

Another object of this invention is the provision of a wrapper for frozen confections consisting of a container of paper or other suitable material having overlapping margins easily separable by a slight pull upon a tear tab to completely free the wrapper from its contents, the wrapper being of such character that the confection will be left in a serving member ready for use.

It is also an object of this invention to provide a wrapper for frozen confections of such shape and character as to be ready for use in a sundae.

Still another object of this invention is the provision of a wrapper for frozen confections of a form to be used in a sundae, the wrapper being of such character as to permit flavoring media to be applied to the confection either before or after the removal of the wrapper.

Further, the present invention provides a wrapper for a frozen confection in complete sundae form, whereupon the wrapper may be simply removed and a proper sundae is already available.

Also an object of this invention is the provision of a wrapper for a frozen confection, the wrapper being readily and simply made from a single blank of material, the construction permitting the ready removal of the wrapper from the confection, the wrapper being further of such economical construction and permitting such expeditious handling as to well warrant the disposal of the wrapper after a single usage.

While some of the more salient features, characteristics, and advantages of the present invention have been above pointed out, others will become apparent from the following disclosures.

The invention includes these and others features of construction hereinafter described, and shown in a preferred form in the drawing, as more particularly indicated by the claim.

On the drawing:

Figure 1 is an elevational view of a wrapper embodying principles of the present invention, showing the same in proper position for the dispensing of a frozen confection in shape to be used as a sundae.

Figure 2 is a bottom plan view of the structure shown in Figure 1.

Figure 3 is a reduced plan view of the blank used in forming the wrapper shown in Figures 1 and 2.

Figure 4 is a reduced central vertical sectional view of the wrapper containing a frozen confection.

As shown on the drawing:

In the illustrated embodiment of this invention there is seen a blank 5 (Figure 3), which may be of any suitable material such, for example, as paper of the type commonly used in paper drinking cups and the like. In this instance, the blank is in the general form of a segment of a circle with the inner portion of the segment cut away along a curved line 6 which, after the folding of the blank, will leave an aperture in one end of the resultant container or wrapper. Of course, the segment or blank also has an outer curved edge 7 for defining the mouth of the resultant container and through which the container or wrapper may be initially filled with confection. The ends of the curved edge 7 terminate in inwardly converging side edges 8 and 9, respectively, and the marginal portions adjacent these side edges are designed to be overlapped when the container is formed. One of these marginal portions, in this instance the portion adjacent the edge 8, is supplied with a suitable adhesive 10, such, for example, as crystallizing glue, of just sufficient amount and character as to properly hold the blank in container form while the confection is therein, but insufficient to preclude ready separation of the marginal portions of the blank when the container is stripped or removed in the dispensing of the confection.

Due to its particular contour and construction, the blank 5 is adapted to be rolled into a container or wrapper of the form of a truncated cone, the overlapped margins of the truncated cone being held together by the adhesive above mentioned. The curved edge 7 defines an opening in the large end of the truncated cone, preferably the mouth of the container, and the curved edge 6 defines a smaller opening in the smaller end of the cone. The rolling or forming operation may be effected by any suitable equipment such as is commonly used in the formation of paper drinking cups. In the formed container the edges 8 and 9 extend substantially obliquely with respect to the axis of the container and the inner end of the margin adjacent the edge 8 extends beyond the adhesive and projects substantially tangentially to the opening defined by the edge 6 to form a tear or stripping tab 11, as best seen in Figure 1. This tab may be easily grasped between the thumb and finger of an attendant, and a slight pull upon this tab will separate the glued marginal portions and so restore the blank to initial form and permit the contents of the wrapper to rest upright in a dish or other vessel.

After the container is formed by rolling or folding the blank, it is filled with a confectionery mass 12 (Figure 4), which is frozen, congealed, or hardened within the container so that the mass will adhere to the container. Consequently, with the adherence of the confection to the container no strain is placed upon the glued marginal portions of the wrapper, and the probability of the wrapper becoming open or removed from the confection prior to the dispensing of the confection is substantially eliminated.

The opening defined by the edge 6 of the blank in the smaller end of the wrapper provides an entrance for a projection or a mold to enter within the blank and form an indentation or cavity 13 in the confectionery mass contemporaneously with the hardening of the mass. This cavity 13 may be made of proper size commensurate with the size of the confectionery mass to hold an adequate amount of flavoring media for a sundae. Obviously, the cavity 13 may be filled with flavoring media before or after the wrapper is removed from the confection. If so desired, the flavoring media may be placed in the cavity immediately after a congealing of the confection and then the whole subsequently treated to a further freezing operation so that a complete sundae may be initially made up and subsequently dispensed ready for consumption by the simple removal of the wrapper.

After the confection has been packaged in the container or wrapper, the whole is preferably kept at a temperature sufficiently low for the confectionery mass to retain its rigidity, and in one form of commercial practice, a plurality of such packaged confections are delivered to a retail dealer. Upon the request of a purchaser for a sundae, for example, it is a simple expedient for the dealer to place the packaged confection upon a suitable serving member with the indentation 13 uppermost. A simple pull upon the stripping tab 11 separates the glued marginal portions of the blank and removes the container or wrapper from the confection. If the flavoring media has not already been applied to the confection, it can subsequently be applied to the cavity 13, this cavity serving as a gauge for the proper amount of flavoring media as aforesaid.

Regardless of when the flavoring media is applied, it will be noted that the wrapper is of such shape as to contain a confectionery mass of such shape that upon a slight melting of the mass, the flavoring media will gravitate over the sides of the mass and thus render the resultant sundae more palatable.

Of course, the container may be made in somewhat different form from that shown depending upon the use for which the confectionery mass is intended, as will be apparent to one skilled in the art.

From the foregoing, it will be apparent that I have provided a novel wrapper for frozen confections, the wrapper being exceedingly simple in construction, easy to manufacture, and very easy to manipulate and remove from the confection. The wrapper lends itself to removal from the confection with great facility without danger of objectionable contact with the hands of the attendant with the confectionery mass proper. Further, it will be noted that the wrapper may be manufactured in such an economical manner as to well warrant the disposal of the wrapper after a single usage.

I am aware that many changes may be made and numerous details of construction may be varied through a wide range without departing from the principles of this invention and I, therefore, do not purpose limiting the patent granted hereon otherwise than necessitated by the prior art.

I claim as my invention:

As an article of manufacture, a paper container for frozen confections comprising a single sheet of material formed with overlapping margins into a truncated conical container having both a mouth and a relatively smaller opening, said sheet comprising a segment of a circle with the inner end completely removed along an arcuate line to provide for said smaller opening, the overlapped margins of said blank being held together by adhesive forming a seam disposed at an angle to an element of the conical container and being readily separable to remove the container from its contents, the edges of said seam being substantially straight edges of which the outer projects loosely from the container adjacent said smaller opening to form a tear tab for separation of the overlapped margins.

FREDERICK THOMAS KREIN.